United States Patent
Xu et al.

(10) Patent No.: US 9,629,134 B2
(45) Date of Patent: Apr. 18, 2017

(54) METHOD FOR ASSISTING IN UPLINK TRANSMISSION, AND BASE STATION

(71) Applicant: Huawei Technologies Co., Ltd., Shenzhen, Guangdong (CN)

(72) Inventors: Min Xu, Shanghai (CN); Dong Chen, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 174 days.

(21) Appl. No.: 14/615,693

(22) Filed: Feb. 6, 2015

(65) Prior Publication Data

US 2015/0156766 A1     Jun. 4, 2015

Related U.S. Application Data

(63) Continuation of application No. PCT/CN2012/079946, filed on Aug. 10, 2012.

(51) Int. Cl.
*H04W 4/00* (2009.01)
*H04W 72/04* (2009.01)
(Continued)

(52) U.S. Cl.
CPC ....... *H04W 72/0413* (2013.01); *H04L 5/0032* (2013.01); *H04L 5/0048* (2013.01);
(Continued)

(58) Field of Classification Search
USPC .......... 370/328, 252, 329, 331, 338; 455/68, 455/436
See application file for complete search history.

(56) References Cited

U.S. PATENT DOCUMENTS

2005/0079865 A1   4/2005   Ahn et al.
2008/0227461 A1*  9/2008   Dayal .................. H04L 1/0025
                                                 455/452.2
(Continued)

FOREIGN PATENT DOCUMENTS

CN   101990194 A  *  3/2011  .............. H04W 8/22
CN   101990195 A  *  3/2011  .............. H04W 8/22
(Continued)

OTHER PUBLICATIONS

"3rd Generation Partnership Project; Technical Specification Group Radio Access Network; Enhanced uplink; Overall description; Stage 2 (Release 11)", 3GPP TS 25.319 v11.4.0, Jun. 2012, 85 pages.

*Primary Examiner* — Phuongchau Ba Nguyen

(57) ABSTRACT

Embodiments of the present invention provide a method for assisting in uplink transmission and a base station. The method for assisting in uplink transmission includes: acquiring, by a first base station, auxiliary uplink control information of a user equipment; sending, by the first base station, the auxiliary uplink control information to a second base station; and performing, by the second base station, uplink data scheduling for the user equipment according to the auxiliary uplink control information. Therefore, a problem in which the second base station cannot acquire or correctly demodulate uplink information sent by the user equipment and consequently cannot schedule uplink data from the user equipment is solved.

12 Claims, 9 Drawing Sheets

(51) Int. Cl.
*H04W 72/12* (2009.01)
*H04L 5/00* (2006.01)
*H04W 24/08* (2009.01)
*H04W 88/08* (2009.01)

(52) U.S. Cl.
CPC ....... *H04W 24/08* (2013.01); *H04W 72/0426* (2013.01); *H04W 72/1284* (2013.01); *H04W 88/08* (2013.01)

(56) References Cited

U.S. PATENT DOCUMENTS

| | | |
|---|---|---|
| 2011/0053585 A1 | 3/2011 | Otonari |
| 2011/0223900 A1 | 9/2011 | Yu et al. |
| 2013/0005379 A1 | 1/2013 | Yamazaki |
| 2013/0023276 A1 | 1/2013 | Du et al. |
| 2013/0310041 A1 | 11/2013 | Deng et al. |

FOREIGN PATENT DOCUMENTS

| | | |
|---|---|---|
| CN | 102158964 A | 8/2011 |
| CN | 102196509 A | 9/2011 |
| CN | 102202311 A | 9/2011 |
| CN | 102413447 A | 4/2012 |
| CN | 102413478 A | 4/2012 |
| CN | 102625388 A | 8/2012 |
| EP | 1 775 982 A1 | 4/2007 |
| EP | 2 367 397 A1 | 9/2011 |
| WO | WO 2011/111751 A1 | 9/2011 |
| WO | WO 2011/162395 A1 | 12/2011 |

\* cited by examiner

METHOD FOR ASSISTING IN UPLINK TRANSMISSION, AND BASE STATION

CROSS-REFERENCE TO RELATED APPLICATIONS

This application is a continuation of International Application No. PCT/CN2012/079946, filed on Aug. 10, 2012, which is hereby incorporated by reference in its entirety.

TECHNICAL FIELD

Embodiments of the present invention relate to the field of communications, and in particular, to a method for assisting in uplink transmission, and a base station.

BACKGROUND

The development of mobile communications technologies results in increasingly high user requirements. A micro cell is introduced in a macro cell to form a heterogeneous network, so that the number of cells in a system may be multiplied, and when throughput of each cell remains unchanged, a system capacity may be multiplied. Introduction of the micro cell may achieve the following advantages: relatively small coverage, cost savings in network devices, network deployment, network transmission, and network operating, energy conservation, low radiation, and the like. A micro base station is in wide use, for example, the use of a micro base station can be found at home, enterprise, or public place. At an enterprise or a public place, a plurality of micro base stations is required to provide continuous network coverage, and introduction of the micro cell can increase coverage in the enterprise or public place, and assist the macro cell in service offload.

The micro cell and the macro cell may be deployed at same frequency or at different frequency. In the event that the micro cell and the macro cell are deployed at same frequency, uplink transmit power of a user equipment (UE) decreases due to power control after the UE adds the micro cell/macro cell to an active set in advance. Therefore, a serving base station cannot acquire or correctly demodulate information sent by the UE in the uplink, which in turn causes the serving base station unable to schedule uplink data from the UE according to scheduling information of the UE.

SUMMARY

Embodiments of the present invention provide a method for assisting in uplink transmission and a base station, which aims to solve a problem in which a serving base station cannot acquire or correctly demodulate uplink information sent by a user equipment and consequently cannot schedule uplink data from the user equipment.

According to a first aspect, an embodiment of the present invention provides a method for assisting in uplink transmission, including: acquiring, by a first base station, auxiliary uplink control information of a user equipment; and sending, by the first base station, the auxiliary uplink control information to a second base station, so that the second base station performs uplink data scheduling for the user equipment according to the auxiliary uplink control information.

In a first possible implementation, the acquiring, by a first base station, auxiliary uplink control information of a user equipment includes: determining, by the first base station, at least one of the following is the auxiliary uplink control information of the user equipment: scheduling information, a happy bit, and reference grant information, where the first base station acquires the scheduling information and the happy bit from the user equipment; and the first base station determines, according to quality of an uplink link from the user equipment to the first base station, the reference grant information that needs to be sent to the user equipment.

With reference to the first possible implementation of the first aspect, in a second possible implementation, if the first base station determines the reference grant information is the auxiliary uplink control information, or if the first base station determines the scheduling information is the auxiliary uplink control information, or if the user equipment separately sends the scheduling information and the first base station determines the scheduling information separately sent by the user equipment is the auxiliary uplink control information, the method further includes: sending, by the first base station, the timing information to the second base station.

With reference to the second possible implementation of the first aspect, in a third possible implementation, the timing information includes at least one of the following: a continuous frame number, a system frame number, a subframe number, a hybrid automatic repeat request process number, and transmission time interval information.

With reference to the first aspect, or the foregoing possible implementations of the first aspect, in a fourth possible implementation, before the acquiring auxiliary uplink control information, the method further includes: acquiring, by the first base station, an auxiliary scheduling request sent by a first network side device or the second base station, where the first network side device is a radio network controller for the second base station.

With reference to the fourth possible implementation of the first aspect, in a fifth possible implementation, the method includes: the auxiliary scheduling request is sent to the first base station when a volume of the data successfully acquired by the second base station from the user equipment is periodically measured and the data volume is less than a trigger threshold; or the auxiliary scheduling request is sent to the first base station if an auxiliary scheduling start indication is obtained from the second base station, where the auxiliary scheduling start indication is sent to the first network side device when trigger information measured by the second base station meets a trigger threshold; and at least one of the following is preset, or measured according to trigger configuration information: a type of the trigger information measured by the second base station, a measurement duration, and the trigger threshold, and the trigger configuration information is preset on the second base station or is acquired from the first network side device.

With reference to first aspect, or any one of the first possible implementation of the first aspect to the third possible implementation of the first aspect, in a sixth possible implementation, before the acquiring, by the first base station, auxiliary uplink control information, or before the sending, by the first base station, the auxiliary uplink control information to the second base station, the method further includes: acquiring scheduling configuration information, where the scheduling configuration information is used for indicating at least one of the following: content, a reporting mode, and a transmission mode of the auxiliary uplink control information.

With reference to the sixth possible implementation of the first aspect, in a seventh possible implementation, the acquiring, by the first base station, the scheduling configuration information includes: acquiring, by the first base station, the scheduling configuration information preset on the first base station; or acquiring, by the first base station, the scheduling configuration information from a first network side device or the second base station, where the first network side device is a radio network controller for the second base station.

With reference to the first aspect, or the foregoing possible implementations of the first aspect, in an eighth possible implementation, the first base station sends the auxiliary uplink control information to the second base station by using a control plane message; or the first base station sends the auxiliary uplink control information to the second base station by using a data plane frame protocol.

With reference to the first aspect, or the foregoing possible implementations of the first aspect, in a ninth possible implementation, the method includes: sending, by the first base station, the auxiliary uplink control information to the second base station if the first base station obtains the auxiliary uplink control information; or periodically sending, by the first base station, the auxiliary uplink control information to the second base station.

With reference to the ninth possible implementation of the first aspect, in a tenth possible implementation, the method includes: measuring, by the first base station, auxiliary measurement information if the first base station periodically sends the auxiliary uplink control information to the second base station; and sending, by the first base station, the auxiliary measurement information to the second base station, where the auxiliary measurement information includes at least one of the following: scheduling information sent by the user equipment last time, periodical measurement duration, unhappy times, and latest reference grant information.

According to a second aspect, an embodiment of the present invention provides a method for assisting in uplink transmission, including: acquiring, by a second base station, auxiliary uplink control information from a first base station; and sending, by the second base station, grant information to the user equipment according to the auxiliary uplink control information, so as to perform uplink data scheduling on the user equipment.

With reference to the second aspect, in a first possible implementation, the auxiliary uplink control information is at least one of the following: scheduling information, a happy bit, and reference grant information.

With reference to the first possible implementation of the second aspect, in a second possible implementation, if the auxiliary uplink control information is the scheduling information, or if the auxiliary uplink control information is the reference grant information, or if the user equipment separately sends the scheduling information and the first base station determines the scheduling information separately sent by the user equipment is the auxiliary uplink control information, the method further includes: acquiring, by the second base station, timing information.

With reference to the second possible implementation of the second aspect, in a third possible implementation, the timing information includes at least one of the following: a continuous frame number, a system frame number, a subframe number, a hybrid automatic repeat request process number, and transmission time interval information.

With reference to the second possible implementation of the second aspect, or the third possible implementation of the second aspect, in a fourth possible implementation, the method includes: if the auxiliary uplink control information is the scheduling information separately sent by the user equipment, and the second base station obtains the timing information, sending, by the second base station, an acknowledgement indication to the user equipment.

With reference to the second aspect, or the foregoing possible implementations of the second aspect, in a fifth possible implementation, the method further includes: measuring, by the second base station, trigger information, where the trigger information includes at least one of the following: a rate of failing in acquiring data from the user equipment or demodulating data from the user equipment, a signal to interference ratio, and a bit error rate; and if the trigger information meets a trigger threshold, sending, by the second base station, an auxiliary scheduling start indication to a first network side device, so that the first network side device sends an auxiliary scheduling request to the first base station if the auxiliary scheduling start indication is obtained, where the first network side device is a radio network controller.

With reference to the second aspect, or any one of the first possible implementation of the second aspect to the third possible implementation of the second aspect, in a sixth possible implementation, the method further includes: measuring, by the second base station, trigger information, where the trigger information includes a volume of data successfully acquired from the user equipment or at least one of the following: a rate of failing in acquiring data from the user equipment or demodulating data from the user equipment, a signal to interference ratio, and a bit error rate; and sending, by the second base station, an auxiliary scheduling request to the first base station if the trigger information meets a trigger condition.

With reference to the fourth possible implementation of the second aspect or the fifth possible implementation of the second aspect, in a seventh possible implementation, the method further includes: before the measuring, by the second base station, the trigger information, acquiring trigger configuration information, where the trigger configuration information is used for indicating at least one of the following: the trigger information that needs to be measured, measurement duration, and the trigger threshold.

With reference to the sixth possible implementation of the second aspect, in an eighth possible implementation, the method includes: acquiring, by the second base station, the trigger configuration information preset on the second base station; or acquiring, by the second base station, the trigger configuration information from the first network side device.

With reference to the second aspect, or the foregoing possible implementations of the second aspect, in a ninth possible implementation, the method further includes: sending, by the second base station, scheduling configuration information to the first base station, where the scheduling configuration information is used for indicating at least one of the following: content, a reporting mode, and a transmission mode of the auxiliary uplink control information.

With reference to the second aspect, or the foregoing possible implementations of the second aspect, in a tenth possible implementation, the method further includes: acquiring, by the second base station, the auxiliary uplink control information from the first base station by using a control plane message; or acquiring, by the second base station, the auxiliary uplink control information from the first base station by using a data plane frame protocol.

With reference to the second aspect, or the foregoing possible implementations of the second aspect, in an eleventh possible implementation, the method further includes: acquiring, by the second base station, auxiliary measurement information from the first base station, where the auxiliary measurement information includes at least one of the following: scheduling information sent by the user equipment last time, periodical measurement duration, unhappy times, and latest reference grant information.

According to a third aspect, an embodiment of the present invention provides a base station, including: an acquiring module, configured to acquire auxiliary uplink control information; and a sending module, configured to send the auxiliary uplink control information to a second base station.

With reference to the third aspect, in a first possible implementation, the acquiring module is configured to acquire scheduling information and/or a happy bit from the user equipment, or is configured to determine reference grant information according to quality of a link from the user equipment to the base station; and the acquiring module determines at least one of the following: the scheduling information, the happy bit, and the reference grant information is the auxiliary uplink control information.

With reference to the first possible implementation of the third aspect, in a second possible implementation, if the acquiring module determines the reference grant information is the auxiliary uplink control information, or if the acquiring module determines the scheduling information is the auxiliary uplink control information, or if the user equipment separately sends the scheduling information and the acquiring module determines the scheduling information separately sent by the user equipment is the auxiliary uplink control information, the sending module is further configured to send timing information to the second base station.

With reference to the third aspect and the foregoing possible implementations of the third aspect, in a third possible implementation, the acquiring module is further configured to acquire, before the acquiring the auxiliary uplink control information, an auxiliary scheduling request from a first network side device or the second base station, where the first network side device is a radio network controller for the second base station.

With reference to the third aspect, the first possible implementation of the third aspect, or the second possible implementation of the third aspect, in a fourth possible implementation, the acquiring module is further configured to acquire, before the acquiring the auxiliary uplink control information, scheduling configuration information.

With reference to the third aspect, or the foregoing possible implementations of the third aspect, in a fifth possible implementation, that the sending module is configured to send the auxiliary uplink control information to the second base station includes that: the sending module is configured to send, if the acquiring module obtains the auxiliary uplink control information, the auxiliary uplink control information to the second base station; or the sending module is configured to periodically send the auxiliary uplink control information to the second base station.

With reference to the fifth possible implementation of the third aspect, in a sixth possible implementation, the base station further includes: a measuring module, configured to measure auxiliary measurement information, where the sending module is further configured to periodically send the auxiliary measurement information to the second base station.

According to a fourth aspect, an embodiment of the present invention provides a base station, including: an acquiring module, configured to acquire auxiliary uplink control information from a first base station; and a sending module, configured to send grant information to the user equipment according to the auxiliary uplink control information, so that uplink data scheduling is performed for the user equipment.

With reference to the fourth aspect, in a first possible implementation, the auxiliary uplink control information acquired by the acquiring module from the first base station includes at least one of the following: scheduling information, a happy bit, and reference grant information.

With reference to the first possible implementation of the fourth aspect, in a second possible implementation, if the auxiliary uplink control information is the reference grant information, or if the auxiliary uplink control information is the scheduling information, or if the user equipment separately sends the scheduling information and the first base station determines the scheduling information separately sent by the user equipment is the auxiliary uplink control information, the acquiring module is further configured to acquire timing information.

With reference to the second possible implementation of the fourth aspect, in a third possible implementation, if the auxiliary uplink control information is the scheduling information separately sent by the user equipment and the acquiring module acquires the timing information, the sending module is further configured to send an acknowledgement indication to the user equipment.

With reference to the fourth aspect, or the foregoing possible implementations of the fourth aspect, in a fourth possible implementation, the base station further includes: a measuring module, configured to measure trigger information, where the trigger information includes at least one of the following: a rate of failing in acquiring data from the user equipment or demodulating data from the user equipment, a signal to interference ratio, and a bit error rate; and the sending module is further configured to send, if the trigger information measured by the measuring module meets a trigger threshold, an auxiliary scheduling start indication to the first network side device.

With reference to the fourth aspect, or the first possible implementation of the fourth aspect to the third possible implementation of the fourth aspect, in a fifth possible implementation, the base station further includes: a measuring module, configured to measure triggering information, where the trigger information includes a volume of data successfully acquired by the base station from the user equipment or at least one of the following: a rate of failing in acquiring data from the user equipment or demodulating data from the user equipment, a signal to interference ratio, and a bit error rate; and the sending module is further configured to send an auxiliary scheduling request to the first base station.

With reference to the fourth possible implementation of the fourth aspect, or the fifth possible implementation of the fourth aspect, in a sixth possible implementation, the base station further includes: a configuring module, configured to determine trigger configuration information, where the measuring module measures the trigger information according to the trigger configuration information; and the trigger configuration information is used for indicating at least one of the following: the trigger information that needs to be measured, a measurement duration, and the trigger threshold.

With reference to the fourth possible implementation of the fourth aspect or the fifth possible implementation of the fourth aspect, in a seventh possible implementation, the acquiring module is further configured to acquire trigger configuration information; and the measuring module measures the trigger information according to the trigger configuration information, where the trigger configuration information is used for indicating at least one of the following:

the trigger information that needs to be measured, a measurement duration, and the trigger threshold.

With reference to the fourth aspect, or the first possible implementation of the fourth aspect, in an eighth possible implementation, the base station further includes: a configuring module, configured to determine scheduling configuration information, where the sending module is further configured to send the scheduling configuration information determined by the configuring module to a first network side device.

According to the embodiments of the present invention, a first base station acquires auxiliary uplink control information of a user equipment, and sends the auxiliary uplink control information to a second base station, so that the second base station performs uplink data scheduling for the user equipment according to the auxiliary uplink control information, where the second base station is a serving base station for the user equipment. Therefore, a problem in which a serving base station cannot acquire or correctly demodulate uplink information sent by a user equipment and consequently cannot schedule uplink data from the user equipment is solved.

BRIEF DESCRIPTION OF DRAWINGS

To describe the technical solutions in the embodiments of the present invention more clearly, the following briefly introduces the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

DETAILED DESCRIPTION

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

It should be understood that, the technical solutions of the embodiments of the present invention may be applied to various communications systems, such as: a global system for mobile communications (GSM) system, a code division multiple access (CDMA) system, a wideband code division multiple access (WCDMA) system, a general packet radio service (GPRS) system, a Long Term Evolution (LTE) system, an LTE frequency division duplex (FDD) system, an LTE time division duplex (TDD), a universal mobile telecommunication system (UMTS), a wireless local area network (WLAN), a wireless fidelity (WiFi) system, and a worldwide interoperability for microwave access (WiMAX) system.

A user equipment (UE), also referred to as a mobile terminal, a mobile user equipment, and the like, may communicate with one or more core networks through a radio access network (for example, RAN, Radio Access Network). The user equipment may be a mobile terminal, such as a mobile phone (also referred to as a "cellular" phone) and a computer with a mobile terminal. For example, the user equipment may be a portable, pocket-sized, handheld, computer built-in, or in-vehicle mobile apparatus.

A base station may be a base station (BTS) in the GSM or CDMA, may also be a base station (NodeB) in the WCDMA, and may further be an eNB, or e-NodeB in the LTE, which is not limited in the present invention.

In the embodiments of the present invention, a first base station may be a base station whose corresponding cell is within an active set of a UE, or the first base station may be a base station that can detect uplink information of a UE; and a second base station is a serving base station for the UE.

Figure 1A:
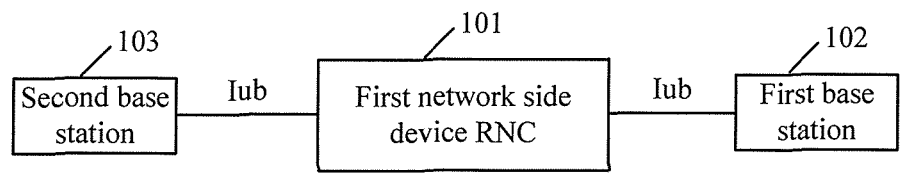
FIG. 1(a) to FIG. 1(f) are schematic diagrams depicting different architectures of a heterogeneous network.

A heterogeneous network may have different architectures. For example:

FIG. 1(a) is a schematic diagram of a first architecture. A first network side device 101 is in charge of controlling a first base station 102 and a second base station 103, and the first network side device 101 is a radio network controller (RNC). The first base station 102 and the second base station 103 interact with the first network side device 101 by using an Iub interface. Coverage of the first base station is less than coverage of the second base station, and a cell corresponding to the first base station is located within the coverage of the second base station. For example, the second base station 103 may be a macro base station corresponding to a macro cell, the first base station 102 may be a micro base station that is corresponding to a micro cell and located within the coverage of the second base station 103, and the micro base station may include but is not limited to a micro base station, a pico base station, an access point (AP), a home NodeB, and the like.

Figure 1B:
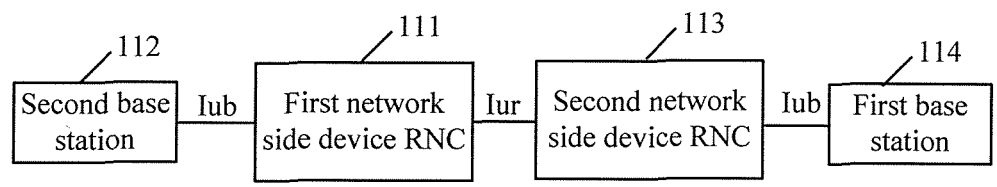

FIG. 1(b) is a schematic diagram of a second architecture. A first network side device 111 is in charge of controlling a second base station 112, and a second network side device 113 is in charge of controlling a first base station 114, where the first network side device 111 is an RNC, and the second network side device 113 is another RNC. The first network side device 111 is connected to the second network side device 113 by using an Iur interface, the first base station 114 is connected to the second network side device 113 by using an Iub interface, and the second base station 112 is connected to the first network side device 111 by using an Iub interface. Coverage of the first base station is less than coverage of the second base station, and a cell corresponding to the first base station is located within the coverage of the second base station. For example, the second base station 112 may be a macro base station corresponding to a macro cell, the first base station 114 may be a micro base station that is corresponding to a micro cell and located within the coverage of the second base station 112, and the micro base station may include but is not limited to a micro base station, a pico base station, an access point (AP), a home NodeB, and the like.

FIG. 1(*c*) is a schematic diagram of a third architecture. A first network side device 121 is in charge of controlling a second base station 122, and a second network side device 123 takes charge of a first base station 124, where the first network side device 121 is an RNC; the second network side device 123 is a base station gateway where traffic converges; and the first base station 124 implements a function of an RNC and a function of a base station. The first network side device 121 is connected to the second network side device 123 by using an Iur interface, the first base station 124 is connected to the second network side device 123 by using an Iuh or Iurh interface, and the second base station 122 is connected to the first network side device 121 by using an Iub interface. Coverage of the first base station is less than coverage of the second base station, and a cell corresponding to the first base station is located within the coverage of the second base station. For example, the second base station 122 may be a macro base station corresponding to a macro cell, the first base station 124 may be a micro base station that is corresponding to a micro cell and located within the coverage of the second base station 122, and the micro base station may include but is not limited to a micro base station, a pico base station, an access point (AP), a home Node, and the like.

FIG. 1(*d*) is a schematic diagram of a fourth architecture. A first network side device 131 is in charge of controlling a first base station 132 and a second base station 133, and the first network side device 131 is an RNC. The first base station 132 and the second base station 133 interact with the first network side device 131 by using an Iub interface. Coverage of the first base station is greater than coverage of the second base station, and a cell corresponding to the second base station is located within the coverage of the first base station. For example, the first base station 132 may be a macro base station corresponding to a macro cell, the second base station 133 may be a micro base station that is corresponding to a micro cell and located within the coverage of the first base station 132, and the micro base station may include but is not limited to a micro base station, a pico base station, an access point (AP), a home NodeB, and the like.

FIG. 1(*e*) is a schematic diagram of a fifth architecture. A first network side device 141 is in charge of controlling a second base station 142, and a second network side device 143 is in charge of controlling a first base station 144, where the first network side device 141 is an RNC, and the second network side device 143 is another RNC. The first network side device 141 is connected to the second network side device 143 by using an Iur interface, the first base station 144 is connected to the second network side device 143 by using an Iub interface, and the second base station 142 is connected to the first network side device 141 by using an Iub interface. Coverage of the first base station is greater than coverage of the second base station, and a cell corresponding to the second base station is located within the coverage of the first base station. For example, the first base station 144 may be a macro base station corresponding to a macro cell, the second base station 142 may be a micro base station that is corresponding to a micro cell and located within the coverage of the first base station 144, and the micro base station may include but is not limited to a micro base station, a pico base station, an access point (AP), a home NodeB, and the like.

FIG. 1(*f*) is a schematic diagram of a sixth architecture. A first network side device 151 takes charge of a second base station 152, and a second network side device 153 takes charge of a first base station 154, where the first network side device 151 is a base station gateway where traffic converges, and the second network side device 153 is an RNC; and the second base station 152 implements a function of an RNC and a function of a base station. The first network side device 151 is connected to the second network side device 153 by using an Iur interface, the second base station 152 is connected to the first network side device 151 by using an Iuh or Iurh interface, and the first base station 154 is connected to the second network side device 153 by using an Iub interface. Coverage of the first base station is greater than coverage of the second base station, and a cell of the second base station is located within the coverage of the first base station. For example, the first base station 154 may be a macro base station corresponding to a macro cell, the second base station 152 may be a micro base station that is corresponding to a micro cell and located within the coverage of the first base station 154, and the micro base station may include but is not limited to a micro base station, a pico base station, an access point (AP), a home NodeB, and the like.

Figure 1C:
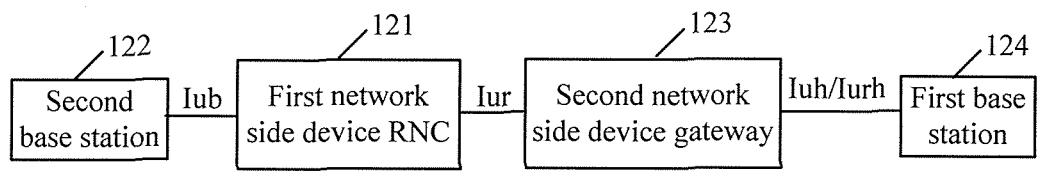
Figure 1D:
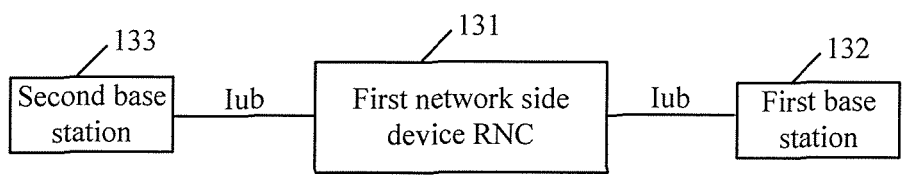
Figure 1E:
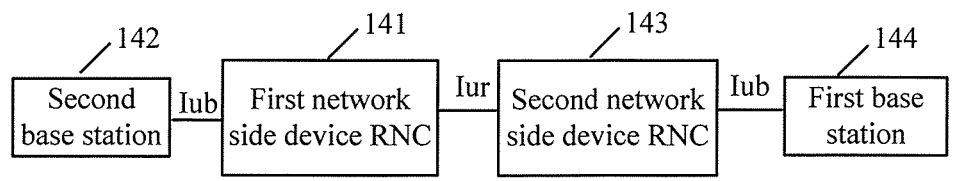
Figure 1F:
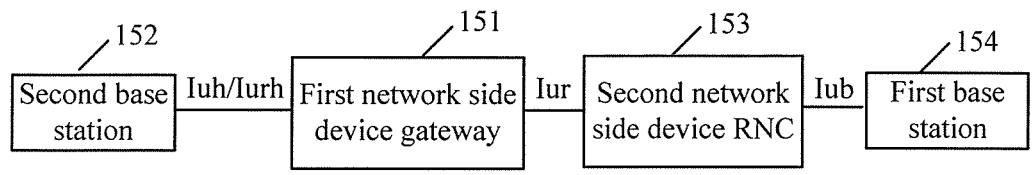
Figure 2:
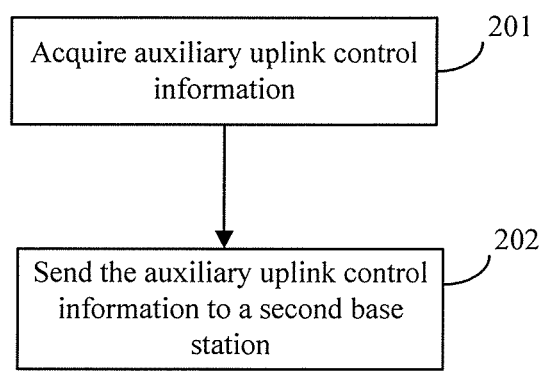
FIG. 2 is a schematic flowchart of a method for assisting in uplink transmission according to an embodiment of the present invention.

FIG. 2 is a schematic flowchart of a method for assisting in uplink transmission according to an embodiment of the present invention. The method in FIG. 2 is executed by a first base station, and the first base station may be a first base station in FIG. 1(*a*) to FIG. 1(*f*). The method includes:

201: A first base station acquires auxiliary uplink control information.

202: The first base station sends the auxiliary uplink control information to a second base station, where the second base station may be a second base station in FIG. 1(*a*) to FIG. 1(*f*).

The first base station may acquire uplink scheduling information (including scheduling information and/or a happy bit) from a UE; and the first base station may further determine, according to quality of an uplink link from the UE to the first base station, reference grant information that needs to be sent to the UE. The first base station determines at least one of the following: the scheduling information, the happy bit, and the reference grant information is the auxiliary uplink control information. The UE may separately send the scheduling information, or may send other information when sending the scheduling information.

Optionally, if the auxiliary uplink control information acquired by the first base station is the scheduling information separately sent by the UE, the first base station may further acquire timing information, where the timing information may be a hybrid automatic repeat request (HARQ) process number or transmission time interval (TTI) information. The first base station may further send the timing information to the second base station.

Optionally, if the auxiliary uplink control information acquired by the first base station is the reference grant information, the first base station may further acquire timing information. Specifically, the first base station determines the timing information indicating sending the reference grant information, where the timing information includes at least one of the following: a continuous frame number, a system frame number, and a subframe number. The first base station may further send the timing information to the second base station, so that the second base station determines, according to the timing information, an HARQ process number or TTI information indicating when to send to the UE.

A reporting mode in which the first base station sends the auxiliary uplink control information to the second base station may be that: the auxiliary uplink control information is sent to the second base station if the first base station obtains the auxiliary uplink control information; or the first base station periodically sends the auxiliary uplink control information to the second base station.

Optionally, if the first base station periodically sends the auxiliary uplink control information to the second base station, the first base station may further measure auxiliary measurement information, where the auxiliary measurement information includes at least one of the following: scheduling information sent by the UE last time, periodical measurement duration, unhappy times, and latest reference grant information. Unhappy times is the number of times the happy bit represents unhappiness. The first base station may further send the auxiliary measurement information to the second base station in the case in which the auxiliary uplink control information is periodically sent to the second base station.

A transmission mode in which the first base station sends the auxiliary uplink control information to the second base station may be that: the first base station sends, to the second base station by using a control plane message or a data plane frame protocol, the auxiliary uplink control information and other related information, for example, the timing information and the auxiliary measurement information.

Optionally, the first base station may further determine at least one of the following: content, the reporting mode, and the transmission mode of the foregoing auxiliary uplink control information according to scheduling configuration information. The scheduling configuration information may be preset on the first base station; or in the architectures in FIG. 1(a) to FIG. 1(e), the first base station may acquire the scheduling configuration information from a first network side device, where the first network side device may be a first network side device in FIG. 1(a) to FIG. 1(e); or in the architecture in FIG. 1(f), the first base station may acquire the scheduling configuration information sent by the second base station, where the second base station may be the second base station in FIG. 1(f).

If the scheduling configuration information is preset on the first base station, the first base station acquires, before the first base station acquires the auxiliary uplink control information or before the first base station sends the auxiliary uplink control information to the second base station, the scheduling configuration information preset on the first base station. According to the scheduling configuration information, the first base station may acquire the auxiliary uplink control information and/or send to the second base station, the auxiliary uplink control information and other related information, for example, the timing information and the auxiliary measurement information.

If the first base station acquires the scheduling configuration information from the first network side device, the first base station acquires the scheduling configuration information from the first network side device before the first base station acquires the auxiliary uplink control information or before the first base station sends the auxiliary uplink control information to the second base station. According to the scheduling configuration information, the first base station may acquire the auxiliary uplink control information and/or send to the second base station, the auxiliary uplink control information and other related information, for example, the timing information and the auxiliary measurement information.

If the first base station acquires the scheduling configuration information sent by the second base station, the first base station acquires, before the first base station acquires the auxiliary uplink control information or before the first base station sends the auxiliary uplink control information to the second base station, the scheduling configuration information sent by the second base station. According to the scheduling configuration information, the first base station may acquire the auxiliary uplink control information and/or send to the second base station, the auxiliary uplink control information and other related information, for example, the timing information and the auxiliary measurement information.

Optionally, in the architectures in FIG. 1(a) to FIG. 1(e), the first base station may further acquire, an auxiliary scheduling request from the first network side device before acquiring the auxiliary uplink control information; and optionally, may further send, an auxiliary scheduling response to the first network side device after acquiring the auxiliary scheduling request. In the architecture in FIG. 1(f), the first base station may further acquire, before acquiring the auxiliary uplink control information, an auxiliary scheduling request sent by the second base station; and optionally, may further send an auxiliary scheduling response to the second base station after acquiring the auxiliary scheduling request.

Optionally, the first base station may send the auxiliary uplink control information and other related information to the second base station directly or through at least one network side device. For example, in the architectures in FIG. 1(a) and FIG. 1(d), the first base station sends, to the second base station through the first network side device, the auxiliary uplink control information and other related information, for example, the timing information and the auxiliary measurement information; and in the architectures in FIG. 1(b), FIG. 1(c), FIG. 1(e), and FIG. 1(f), the first base station sends, to the second base station through a second network side device and the first network side device, the auxiliary uplink control information and other related information, for example, the timing information and the auxiliary measurement information. Similarly, the first base station may further acquire, directly or through at least one network side device, the auxiliary scheduling request and information such as the scheduling configuration information that are sent by the second base station; or the first base station may further acquire, through at least one network side device, the auxiliary scheduling request and information such as the scheduling configuration information that are sent by the first network side device.

According to the method shown in FIG. 2, a problem in which a second base station cannot acquire or correctly demodulate uplink information sent by a UE and consequently cannot schedule uplink data from the UE may be solved.

Figure 3:
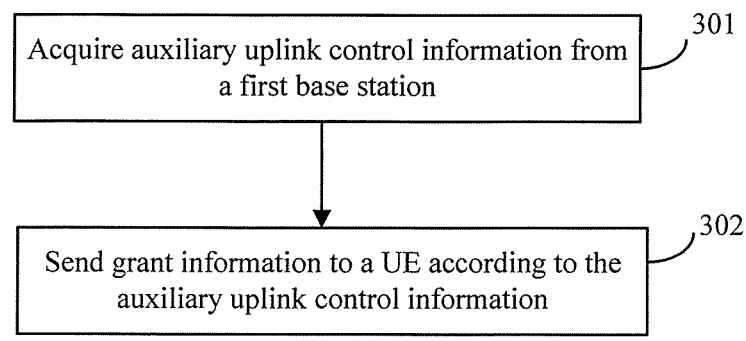
FIG. 3 is a schematic flowchart of a method for assisting in uplink transmission according to an embodiment of the present invention.

FIG. 3 is a schematic flowchart of a method for assisting in uplink transmission according to an embodiment of the present invention. The method in FIG. 3 is executed by a second base station, and the second base station may be a second base station in FIG. 1(a) to FIG. 1(f). The method includes:

301: The second base station acquires auxiliary uplink control information sent by a first base station, where the first base station may be a first base station in FIG. 1(a) to FIG. 1(f).

302: The second base station sends grant information to a UE according to the auxiliary uplink control information, so as to perform uplink data scheduling on the UE.

The auxiliary uplink control information acquired by the second base station may be at least one of the following: scheduling information, a happy bit, and reference grant information.

The grant information sent by the second base station to the UE may be the reference grant information, or absolute grant information or relative grant information determined according to uplink scheduling information (including the scheduling information and/or the happy bit).

Optionally, if the auxiliary uplink control information acquired by the second base station is the scheduling information separately sent by the UE, the second base station may further acquire timing information. Specifically, the second base station acquires the timing information from the first base station, where the timing information may be an HARQ process number or TTI information. If the second base station obtains the scheduling information separately sent by the UE and the timing information sent by the first base station, the second base station may further send, to the UE, an acknowledgement indication to avoid a problem in which if the second base station does not send the acknowledgement indication to acknowledge receipt of the scheduling information separately sent by the UE, the UE resends the scheduling information repeatedly until the maximum number of retransmissions is reached.

Optionally, if the auxiliary uplink control information acquired by the second base station is the reference grant information, the second base station may further acquire timing information. Specifically, the second base station acquires, from the first base station, the timing information determining when sending the reference grant information, where the timing information includes at least one of the following: a continuous frame number, a system frame number, and a subframe number. The second base station determines, according to the timing information, an HARQ process number or TTI information indicating sending the reference grant information to the UE.

The second base station may further acquire auxiliary measurement information from the first base station, where the auxiliary measurement information includes at least one of the following: scheduling information sent by the UE last time, periodical measurement duration, unhappy times, and latest reference grant information. Unhappy times is the number of times the happy bit represents unhappiness.

The second base station may acquire the auxiliary uplink control information and other related information, for example, the timing information and the auxiliary measurement information from the first base station by using a control plane message or a data plane frame protocol.

Optionally, the second base station may further measure trigger information, where the triggering information includes at least one of the following: a rate of failing in acquiring data from the UE or demodulating data from the UE, a signal to interference ratio, and a bit error rate. The trigger information may be preset, or measured according to trigger configuration information, where the trigger configuration information is used for indicating at least one of the following: the trigger information that needs to be measured, measurement duration, and a trigger threshold. The trigger configuration information may be preset on the second base station; or, in the architectures in FIG. 1(*a*) to FIG. 1(*e*), the second base station may acquire the trigger configuration information from a first network side device, where the first network side device may be a first network side device in FIG. 1(*a*) to FIG. 1(*e*).

If the trigger configuration information is preset on the second base station, the second base station may further acquire, before the second base station measures the trigger information, the trigger configuration information preset on the second base station.

In the architectures in FIG. 1(*a*) to FIG. 1(*e*), if the trigger configuration information is sent by the first network side device, the second base station acquires the trigger configuration information from the first network side device before the second base station measures the trigger information. The second base station may measure the trigger information according to the trigger configuration information.

Optionally, in the architectures in FIG. 1(*a*) to FIG. 1(*e*), if the trigger information meets a trigger threshold, the second base station may further send an auxiliary scheduling start indication to the first network side device, so that the first network side device sends an auxiliary scheduling request to the first base station when obtaining the auxiliary scheduling start indication.

Optionally, in the architecture in FIG. 1(*f*), if the trigger information meets a triggering threshold, the second base station may further send an auxiliary scheduling request to the first base station.

Optionally, in the architecture in FIG. 1(*f*), the second base station may further acquire an auxiliary scheduling response from the first base station.

Optionally, the first base station may send, to the second base station directly or through at least one network side device, the auxiliary uplink control information and other related information, for example, the timing information and the auxiliary measurement information. For example, in the architectures in FIG. 1(*a*) and FIG. 1(*d*), the first base station sends, to the second base station through the first network side device, the auxiliary uplink control information and other related information, for example, the timing information and the auxiliary measurement information; and in the architectures in FIG. 1(*b*), FIG. 1(*c*), FIG. 1(*e*), and FIG. 1(*f*), the first base station sends, to the second base station through a second network side device and the first network side device, the auxiliary uplink control information and other related information, for example, the timing information and the auxiliary measurement information. Similarly, the first base station may further acquire, directly or through at least one network side device, the auxiliary scheduling request and information such as the scheduling configuration information that are sent by the second base station; or the first base station may further acquire, through at least one network side device, the auxiliary scheduling request and information such as the scheduling configuration information that are sent by the first network side device.

According to the method shown in FIG. 3, a problem in which a second base station cannot acquire or correctly demodulate uplink information sent by a UE and consequently cannot schedule uplink data from the UE may be solved.

Figure 4:
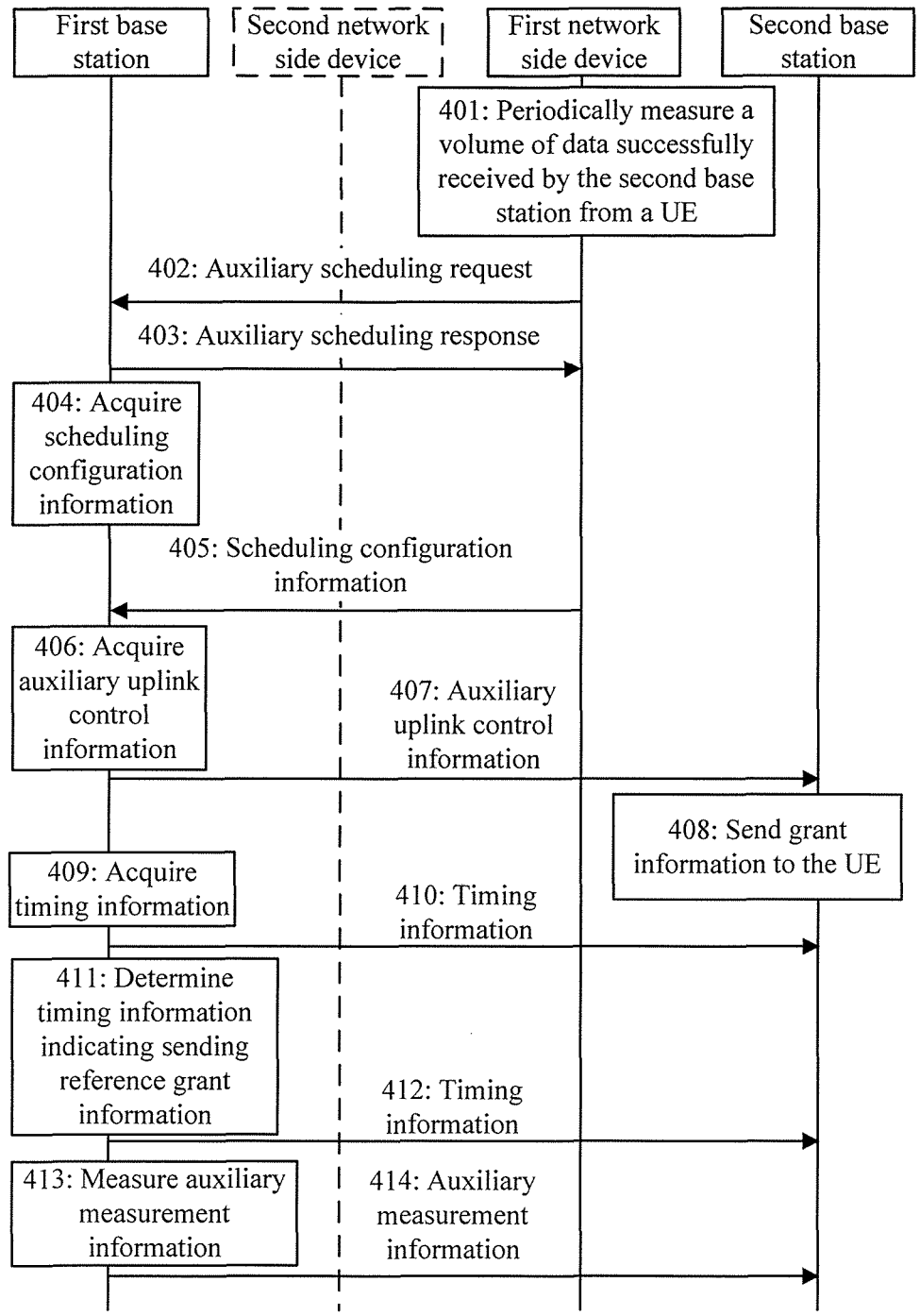
FIG. 4 is a schematic flowchart of a method for assisting in uplink transmission according to an embodiment of the present invention.

FIG. 4 is a schematic flowchart of a method for assisting in uplink transmission according to an embodiment of the present invention. The method for assisting in uplink transmission may be applied to the architectures in FIG. 1(*a*) to FIG. 1(*e*), and includes:

A first base station acquires an auxiliary scheduling request sent by a first network side device, which specifically includes:

401: The first network side device may periodically measure a volume of data successfully acquired by a second base station from a UE, where the first network side device may be a first network side device in FIG. 1(a) to FIG. 1(e), and the second base station may be a second base station in FIG. 1(a) to FIG. 1(e).

402: The first network side device may send the auxiliary scheduling request to the first base station if the volume of the data is less than a trigger threshold, where the first base station may be a first base station in FIG. 1(a) to FIG. 1(e).

Optionally, the first network side device may select a non-serving base station from an active set of the UE, and if a volume of data successfully acquired by the base station is highest, the base station is the first base station.

403: The first base station may send an auxiliary scheduling response to the first network side device if the auxiliary scheduling request is acquired.

At least one of the following may be preset: content, a reporting mode, and a transmission mode of auxiliary uplink control information; or, optionally, the first base station may acquire scheduling configuration information, where the scheduling configuration information is used for indicating at least one of the following: content, a reporting mode, and a transmission mode of auxiliary uplink control information. The first base station determines the at least one of the following according to the scheduling configuration information: content, a reporting mode, and a transmission mode of the auxiliary uplink control information. The scheduling configuration information may be preset on the first base station, or the first base station may acquire the scheduling configuration information from the first network side device.

If the scheduling configuration information is preset on the first base station, the method may further include:

404: Before the first base station acquires auxiliary uplink control information, or before the first base station sends the auxiliary uplink control information to the first network side device, the first base station may acquire the scheduling configuration information preset on the first base station.

If the scheduling configuration information is sent by the first network side device to the first base station, the method may further include:

405: Before the first base station acquires the auxiliary uplink control information, or before the first base station sends the auxiliary uplink control information to the first network side device, the first base station may acquire the scheduling configuration information from the first network side device.

406: The first base station acquires the auxiliary uplink control information. Optionally, the first base station acquires the auxiliary uplink control information if the auxiliary scheduling request is obtained; or the first base station may acquire the auxiliary uplink control information according to the scheduling configuration information.

407: The first base station sends the auxiliary uplink control information to the second base station, so that the second base station performs uplink data scheduling for the UE according to the auxiliary uplink control information. Alternatively, the first base station may send the auxiliary uplink control information to the second base station according to the scheduling configuration information.

408: The second base station sends grant information to the UE according to the auxiliary uplink control information, so as to perform uplink data scheduling for the UE.

The first base station may acquire uplink scheduling information (including scheduling information and/or a happy bit) from the UE; and the first base station may further determine, according to quality of a link from the UE to the first base station, reference grant information that needs to be sent to the UE. The first base station determines at least one of the following is the auxiliary uplink control information: the scheduling information, the happy bit, and the reference grant information. The UE may separately send the scheduling information, or may send other information when sending the scheduling information.

The grant information sent by the second base station to the UE may be the reference grant information, or may further be absolute grant information or relative grant information determined according to the acquired uplink scheduling information.

Optionally, if the auxiliary uplink control information acquired by the first base station is the scheduling information separately sent by the UE, the method may further include: sending, by the first base station, timing information to the second base station, which specifically includes:

409: The first base station acquires timing information, where the timing information may be an HARQ process number or TTI information.

410: The first base station may send the timing information to the second base station. If the scheduling information separately sent by the UE and the timing information sent by the first base station are obtained, the second base station may further send, to the UE, an acknowledgement indication to avoid a problem in which, if the second base station does not send the acknowledgement indication to acknowledge receipt of the scheduling information separately sent by the UE, the UE resends the scheduling information repeatedly until the maximum number of retransmissions is reached.

Optionally, if the first base station determines the reference grant information is the auxiliary uplink control information, the method may further include: sending, by the first base station, timing information to the second base station, which specifically includes:

411: The first base station determines the timing information indicating sending the reference grant information, where the timing information includes at least one of the following: a continuous frame number, a system frame number, and a subframe number.

412: The first base station sends the timing information to the second base station. The second base station determines, according to the timing information, the HARQ process number or the TTI information indicating when to send to the UE.

A reporting mode in which the first base station sends the auxiliary uplink control information to the second base station may be that: the auxiliary uplink control information is sent to the second base station if the first base station obtains the auxiliary uplink control information; or the first base station periodically sends the auxiliary uplink control information to the second base station. Optionally, if the first base station periodically sends the auxiliary uplink control information to the second base station, the method may further include:

413: The first base station measures auxiliary measurement information, where the auxiliary measurement information includes at least one of the following: scheduling information sent by the UE last time, periodical measurement duration, unhappy times, and latest reference grant information. Unhappy times is the number of times the happy bit represents unhappiness.

414: The first base station sends the auxiliary measurement information to the second base station.

A transmission mode in which the first base station sends the auxiliary uplink control information to the second base station may be that: the first base station sends the auxiliary uplink control information to the second base station by using a control plane message or a data plane frame protocol.

The practice of sending, by the first base station, the auxiliary uplink control information to the second base station by using a control plane message is specifically:

In the architecture in FIG. 1(a), the first base station sends the auxiliary uplink control information to the first network side device by using an Iub interface, and the first network side device sends the auxiliary uplink control information to the second base station by using an Iub interface; in the architecture in FIG. 1(b), the first base station sends the auxiliary uplink control information to a second network side device by using an Iub interface, the second network side device then sends the auxiliary uplink control information to the first network side device by using an Iur interface, and the first network side device sends the auxiliary uplink control information to the second base station by using an Iub interface; and in the architecture in FIG. 1(c), the first base station sends the auxiliary uplink control information to the second network side device by using an Iuh or Iurh interface, the second network side device then sends the auxiliary uplink control information to the first network side device by using an Iur interface, and the first network side device sends the auxiliary uplink control information to the second base station by using an Iub interface. In the architecture in FIG. 1(d), a method for sending the auxiliary uplink control information is similar as in FIG. 1(a); in the architecture in FIG. 1(e), a method for sending the auxiliary uplink control information is similar as in FIG. 1(b); and no detail is repeatedly described herein.

Optionally, the first base station may send, to the second base station directly or through at least one network side device, the auxiliary uplink control information and other related information, for example, the timing information and the auxiliary measurement information. For example, in the architectures in FIG. 1(a) and FIG. 1(d), the first base station sends, to the second base station through the first network side device, the auxiliary uplink control information and other related information, for example, the timing information and the auxiliary measurement information; and in the architectures in FIG. 1(b), FIG. 1(c), and FIG. 1(e), the first base station sends, to the second base station through the second network side device and the first network side device, the auxiliary uplink control information and other related information, for example, the timing information and the auxiliary measurement information, where the second network side device may be a second network side device in FIG. 1(b), FIG. 1(c), and FIG. 1(e). Similarly, the first base station may further acquire, directly or through at least one network side device, the auxiliary scheduling request and information such as the scheduling configuration information that are sent by the first network side device, and no detail is repeatedly described herein.

According to the method shown in FIG. 4, the problem in which a second base station cannot acquire or correctly demodulate uplink information sent by a UE and consequently cannot schedule uplink data from the UE may be solved.

Figure 5:
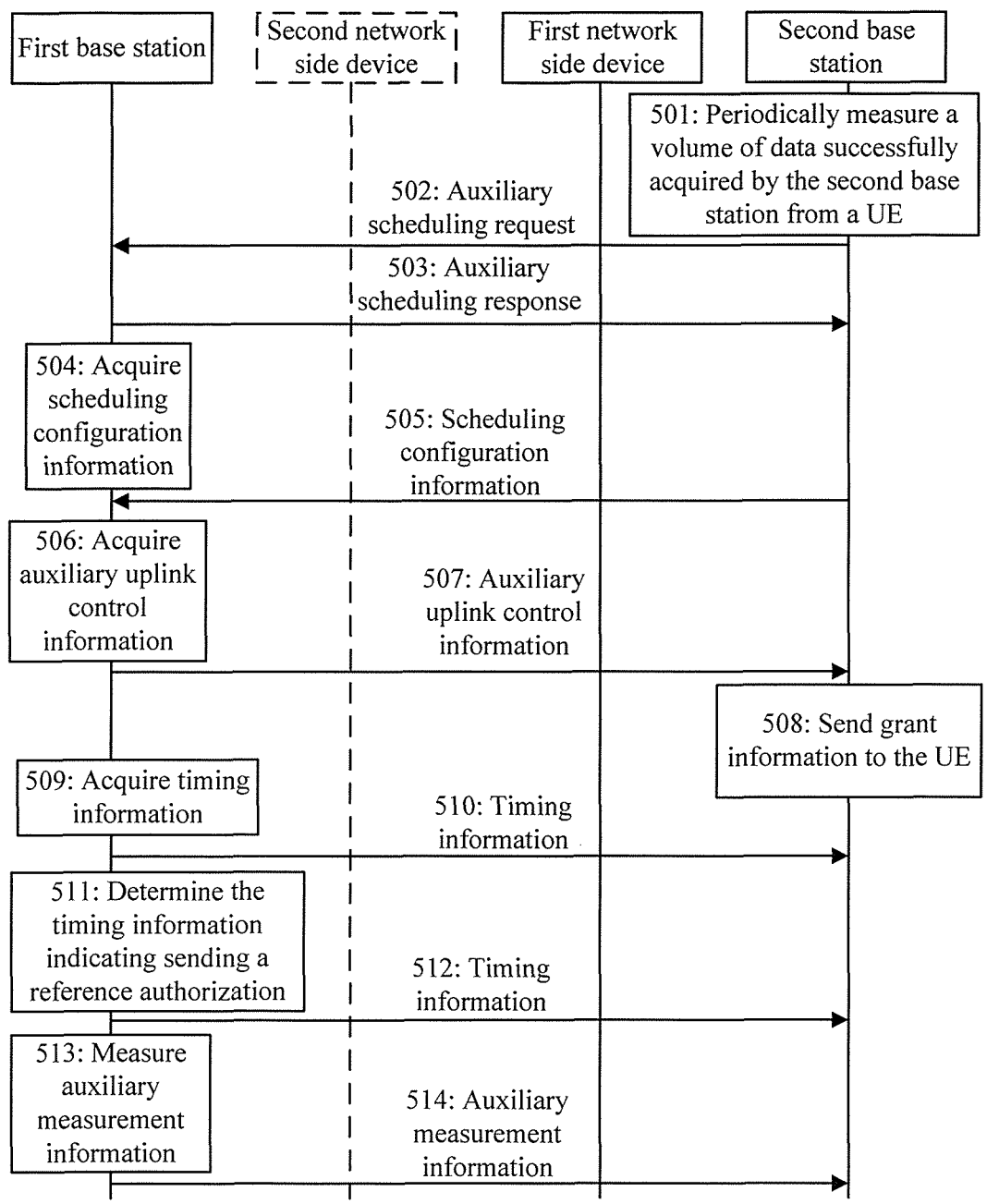
FIG. 5 is a schematic flowchart of a method for assisting in uplink transmission according to an embodiment of the present invention.

FIG. 5 is a schematic flowchart of a method for assisting in uplink transmission according to an embodiment of the present invention. The method for assisting in uplink transmission may be applied to the architecture in FIG. 1(f), and includes:

A first base station acquires an auxiliary scheduling request sent by a second base station, which specifically includes:

501: The second base station may periodically measure a volume of data successfully acquired by the second base station from a UE, where the second base station may be the second base station in FIG. 1(f).

502: The second base station may send the auxiliary scheduling request to the first base station if the volume of the data is less than a trigger threshold, where the first base station may be the first base station in FIG. 1(f).

Optionally, the second base station selects a non-serving base station from an active set of the UE, and if a volume of data successfully acquired by the base station is highest, the base station is the first base station.

503: The first base station may further send an auxiliary scheduling response to the second base station if the auxiliary scheduling request is obtained.

At least one of the following may be preset: content, a reporting mode, and a transmission mode of auxiliary uplink control information; or, optionally, the first base station acquires scheduling configuration information, where the scheduling configuration information is used for indicating at least one of the following: content, a reporting mode, and a transmission mode of auxiliary uplink control information; and the first base station determines the at least one of the following according to the scheduling configuration information: content, a reporting mode, and a transmission mode of auxiliary uplink control information. The scheduling configuration information may be preset on the first base station, or the first base station may acquire the scheduling configuration information sent by the second base station.

If the scheduling configuration information is preset on the first base station, the method may further include:

504: Before the first base station acquires the auxiliary uplink control information, or before the first base station sends the auxiliary uplink control information to the second base station, the first base station may acquire the scheduling configuration information preset on the first base station.

If the scheduling configuration information is sent by the second base station to the first base station, the method may further include:

505: Before the first base station acquires the auxiliary uplink control information, or before the first base station sends the auxiliary uplink control information to the second base station, the first base station may acquire the scheduling configuration information sent by the second base station.

506: The first base station acquires the auxiliary uplink control information. Optionally, the first base station acquires the auxiliary uplink control information if the auxiliary scheduling request is obtained; or the first base station may acquire the auxiliary uplink control information according to the scheduling configuration information.

507: The first base station sends the auxiliary uplink control information to the second base station, so that the second base station performs uplink data scheduling for the UE according to the auxiliary uplink control information. Alternatively, the first base station may send the auxiliary uplink control information to the second base station according to the scheduling configuration information.

508: The second base station sends grant information to the UE according to the auxiliary uplink control information, so as to perform the uplink data scheduling for the UE.

The first base station may acquire uplink scheduling information (including scheduling information and/or a happy bit) from the UE; and the first base station may further determine, according to quality of a link from the UE to the first base station, reference grant information that needs to be sent to the UE. The first base station determines at least one of the following is the auxiliary uplink control information: the scheduling information, the happy bit, and the reference grant information. The UE may separately send the scheduling information, or may further send other information when sending the scheduling information.

The grant information sent by the second base station to the UE may be the reference grant information, or may further be absolute grant information or relative grant information determined according to the acquired uplink scheduling information.

Optionally, if the auxiliary uplink control information acquired by the first base station is the scheduling information separately sent by the UE, the method may further include: sending, by the first base station, timing information to the second base station, which specifically includes:

509: The first base station may acquire timing information, where the timing information may be an HARQ process number or TTI information.

510: The first base station may send the timing information to the second base station. If the scheduling information separately sent by the UE and the timing information sent by the first base station are obtained, the second base station may further send, to the UE, an acknowledgement indication to avoid a problem in which the second base station does not send the acknowledgement indication to acknowledge receipt of the scheduling information separately sent by the UE, the UE resends the scheduling information repeatedly until the maximum number of retransmissions is reached.

Optionally, if the first base station determines the reference grant information is the auxiliary uplink control information, the method may further include: sending, by the first base station, timing information to the second base station, which specifically includes:

511: The first base station may determine the timing information indicating sending the reference grant information, where the timing information includes at least one of the following: a continuous frame number, a system frame number, and a subframe number.

512: The first base station may send the timing information to the second base station. The second base station determines, according to the timing information, the HARQ process number or the TTI information indicating when to send to the UE.

A reporting mode in which the first base station sends the auxiliary uplink control information to the second base station may be that: the auxiliary uplink control information is sent to the second base station if the first base station obtains the auxiliary uplink control information; or the first base station periodically sends the auxiliary uplink control information to the second base station. Optionally, if the first base station periodically sends the auxiliary uplink control information to the second base station, the method may further include:

513: The first base station may measure auxiliary measurement information, where the auxiliary measurement information includes at least one of the following: scheduling information sent by the UE last time, periodical measurement duration, unhappy times, and latest reference grant information. Unhappy times is the number of times the happy bit represents unhappiness.

514: The first base station may send the auxiliary measurement information to the second base station.

A transmission mode in which the first base station sends the auxiliary uplink control information to the second base station may be that: the first base station sends the auxiliary uplink control information to the second base station by using a control plane message or a data plane frame protocol.

The practice of sending, by the first base station, the auxiliary uplink control information to the second base station by using a control plane message is specifically:

The first base station sends the auxiliary uplink control information to a second network side device by using an Iub interface, the second network side device then sends the auxiliary uplink control information to the first network side device by using an Iur interface, and the first network side device sends the auxiliary uplink control information to the second base station by using an Iub interface.

Optionally, the first base station may send, to the second base station directly or through at least one network side device, the auxiliary uplink control information and other related information, for example, the timing information and the auxiliary measurement information. For example, the first base station may send, to the second base station through the second network side device and the first network side device, the auxiliary uplink control information and other related information, for example, the timing information and the auxiliary measurement information. Similarly, the first base station may further acquire, directly or through at least one network side device, the auxiliary scheduling request and information such as the scheduling configuration information that are sent by the second base station, and no detail is repeatedly described herein. The second network side device may be the second network side device in FIG. 1(f).

According to the method shown in FIG. 5, the problem in which a second base station cannot acquire or correctly demodulate uplink information sent by a UE and consequently cannot schedule uplink data from the UE may be solved.

Figure 6:
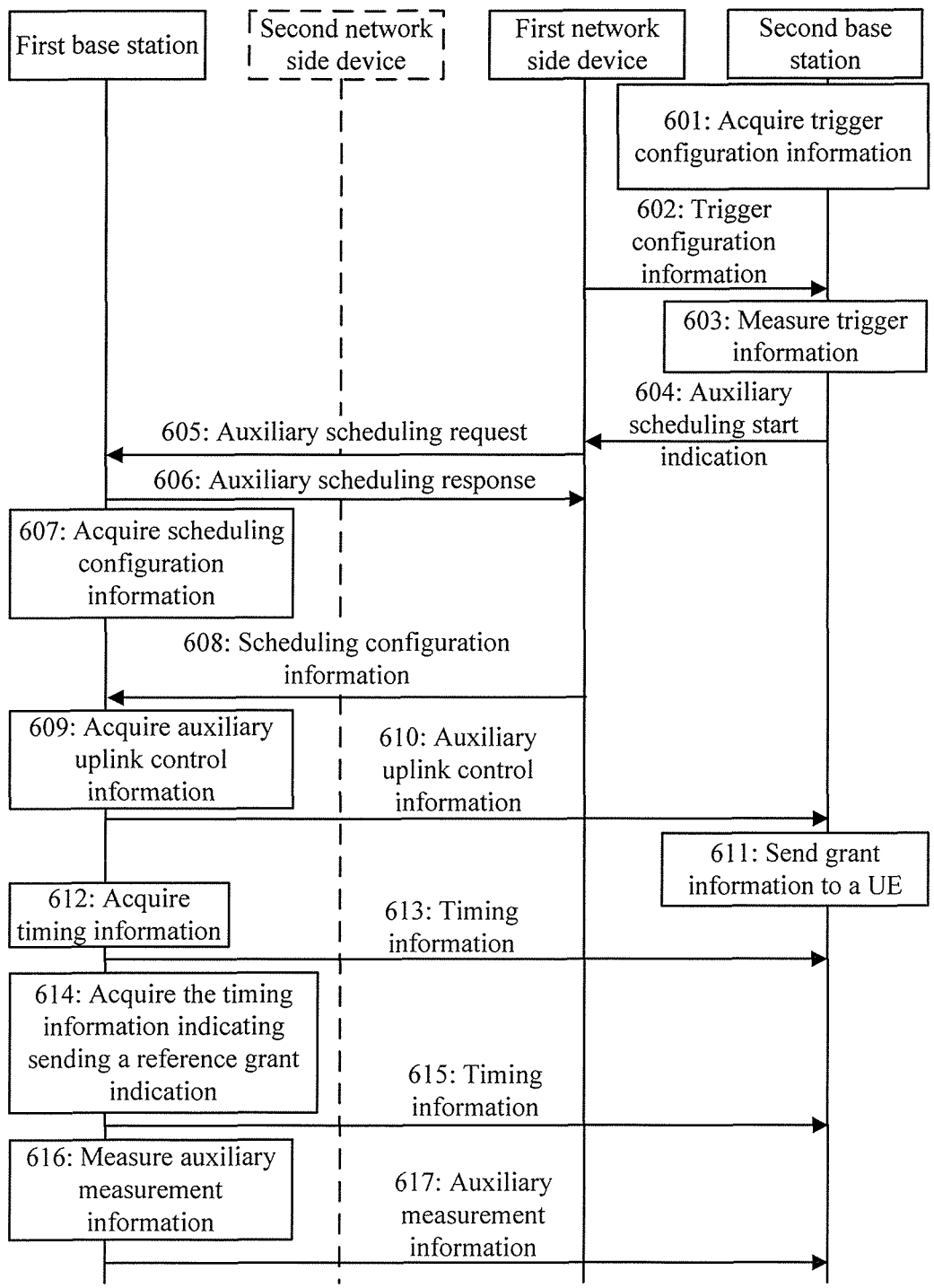
FIG. 6 is a schematic flowchart of a method for assisting in uplink transmission according to an embodiment of the present invention.

FIG. 6 is a schematic flowchart of a method for assisting in uplink transmission according to an embodiment of the present invention. The method for assisting in uplink transmission may be applied to the architectures in FIG. 1(a) to FIG. 1(e).

601: Before a second base station measures trigger information, the second base station may acquire trigger configuration information preset on the second base station, where the second base station may be a second base station in FIG. 1(a) to FIG. 1(e).

602: Before the second base station measures the trigger information, the second base station may acquire the trigger configuration information from a first network side device, where the first network side device from which the trigger configuration information is acquired may be a first network side device in FIG. 1(a).

603: The second base station may measure the trigger information. The trigger information includes at least one of the following: a rate of failing in acquiring data from a UE or demodulating data from the UE, a signal to interference ratio, and a bit error rate.

604: If the trigger information meets a triggering threshold, the second base station may send an auxiliary scheduling start indication to the first network side device.

At least one of the following may be preset, or measured according to the trigger configuration information: the trigger information that needs to be measured, a measurement duration, and the trigger threshold. If the second base station measures the trigger information according to the trigger configuration information and the trigger configuration information is preset on the second base station, step 601 is executed; and if the second base station measures the trigger information according to the trigger configuration information and the trigger configuration information is sent by the first network side device to the second base station, step 602 is executed. The trigger configuration information is used for indicating the at least one of the following: the trigger information that needs to be measured, the measurement duration, and the trigger threshold.

605: The first network side device sends an auxiliary scheduling request to a first base station if the auxiliary scheduling start indication is obtained.

Steps 606 to 617 in FIG. 6 are identical with steps 403 to 414 in FIG. 5, and no detail is repeatedly described herein.

According to the method shown in FIG. 6, a problem in which a second base station cannot acquire or correctly demodulate uplink information sent by a UE and consequently cannot schedule uplink data from the UE may be solved.

Figure 7:
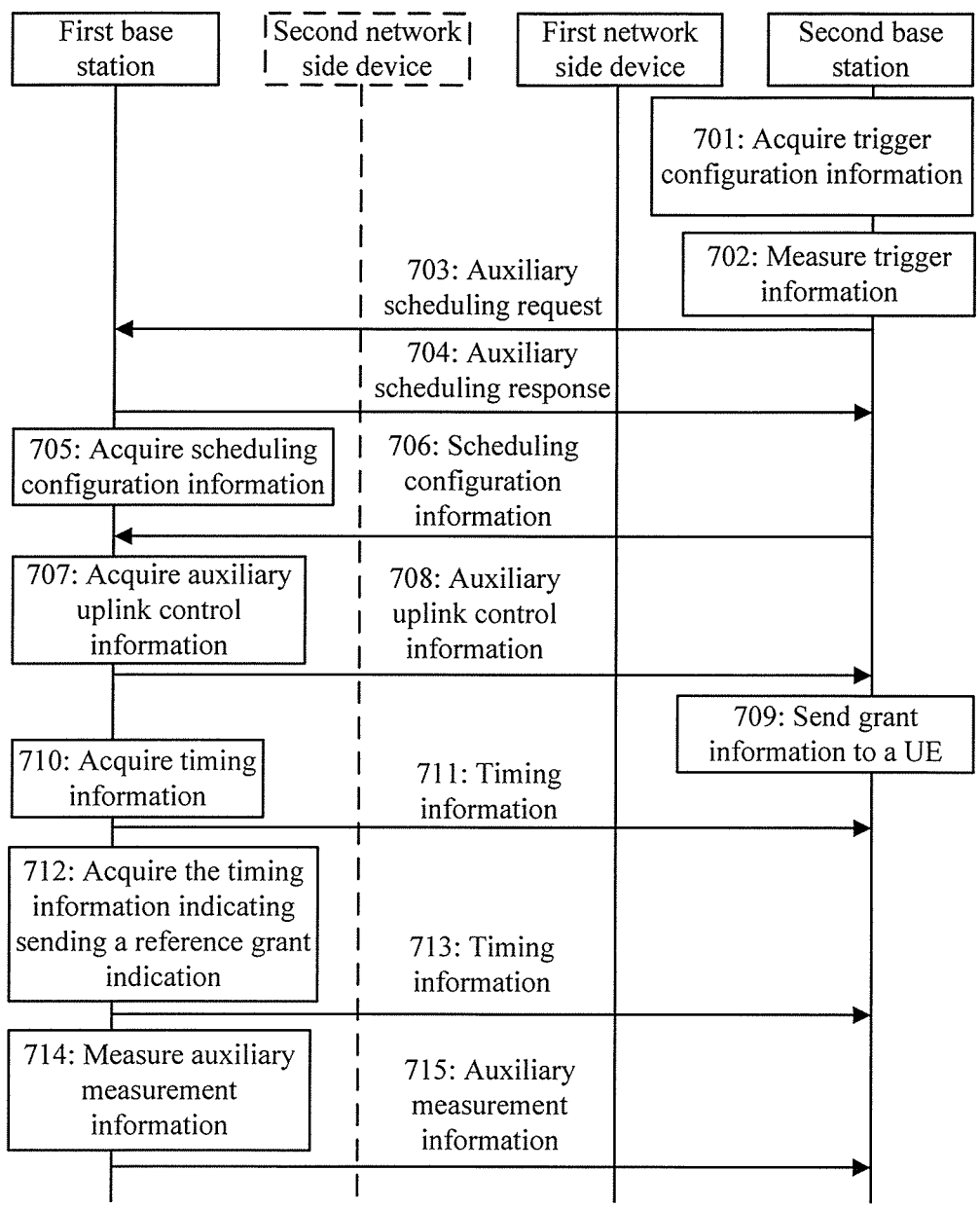
FIG. 7 is a schematic flowchart of a method for assisting in uplink transmission according to an embodiment of the present invention.

FIG. 7 is a schematic flowchart of a method for assisting in uplink transmission according to an embodiment of the present invention. The method for assisting in uplink transmission may be applied to the architecture in FIG. 1(f), and includes:

701: Before a second base station measures trigger information, the second base station may acquire trigger configuration information preset on the second base station, so that the second base station measures the trigger information according to the trigger configuration information, where the second base station may be the second base station in FIG. 1(f), and the trigger configuration information is used for indicating at least one of the following: the trigger information that needs to be measured, a measurement duration, and a trigger threshold.

702: The second base station may measure the trigger information. The trigger information includes at least one of the following: a rate of failing in acquiring data from a UE or demodulating data from the UE, a signal to interference ratio, and a bit error rate.

703: The second base station may send an auxiliary scheduling request to a first base station if the trigger information meets the trigger threshold.

The at least one of the following may be preset, or measured according to the trigger configuration information: the trigger information that needs to be measured, the measurement duration, and the trigger threshold. If the second base station measures the trigger information according to the trigger configuration information, and the trigger configuration information is preset on the second base station, step 701 is executed.

Steps 704 to 715 in FIG. 7 are identical with steps 503 to 514 in FIG. 5, and no detail is repeatedly described herein.

According to the method shown in FIG. 7, a problem in which a second base station cannot acquire or correctly demodulate uplink information sent by a UE and consequently cannot schedule uplink data from the UE may be solved.

Figure 8:
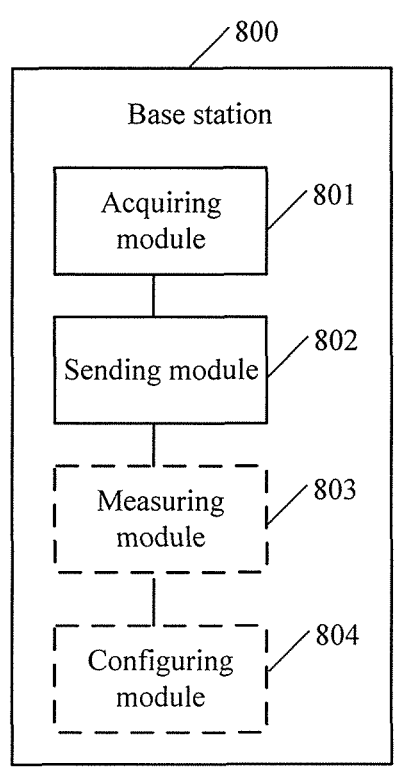
FIG. 8 is a schematic block diagram of abase station according to an embodiment of the present invention.

FIG. 8 is a schematic block diagram of a base station 800 according to an embodiment of the present invention. The base station 800 in FIG. 8 may be a first base station in FIG. 1(a) to FIG. 1(f). The base station 800 includes:

an acquiring module 801, configured to acquire auxiliary uplink control information; and a sending module 802, configured to send the auxiliary uplink control information to a second base station, so that the second base station performs uplink data scheduling for a UE according to the auxiliary uplink control information, where the second base station may be a second base station in FIG. 1(a) to FIG. 1(f).

The acquiring module 801 may be further configured to acquire scheduling information and/or a happy bit from the UE, or may further determine, according to quality of a link from the UE to the first base station, reference grant information that needs to be sent to the UE. The acquiring module 801 is further configured to determine at least one of the following is the auxiliary uplink control information: the scheduling information, the happy bit, and the reference grant information. The UE may separately send the scheduling information, or may further send other information when sending the scheduling information.

Optionally, if the auxiliary uplink control information acquired by the acquiring module 801 is the scheduling information separately sent by the UE, the acquiring module 801 may be further configured to acquire timing information, where the timing information may be an HARQ process number or TTI information. The sending module 802 may further be configured to send the timing information to the second base station, so that if the scheduling information separately sent by the UE and the timing information sent by the base station 800 are obtained, the second base station sends, to the UE, an acknowledgement indication to avoid a problem in which if the second base station does not send the acknowledgement indication to acknowledge receipt of the scheduling information separately sent by the UE, the UE resends the scheduling information repeatedly until the maximum number of retransmissions is reached.

Optionally, the acquiring module 801 may be further configured to acquire timing information if the acquiring module 801 is further configured to determine the reference grant information is the auxiliary uplink control information. Specifically, the acquiring module 801 is further configured to determine the timing information indicating sending the reference grant information, where the timing information includes at least one of the following: a continuous frame number, a system frame number, and a subframe number. The sending module 802 is further configured to send the timing information to the second base station, so that the second base station determines, according to the timing information, an HARQ process number or TTI information indicating when to send to the UE.

A reporting mode in which the sending module 802 is further configured to send the auxiliary uplink control information to the second base station may be that: the sending module 802 is further configured to send the auxiliary uplink control information to the second base station if the acquiring module 801 obtains the auxiliary uplink control information; or the sending module 802 is further configured to periodically send the auxiliary uplink control information to the second base station.

Optionally, if the sending module 802 is further configured to periodically send the auxiliary uplink control information to the second base station, the base station 800 may further include a measuring module 803, where the measuring module 803 is configured to measure auxiliary measurement information, and the auxiliary measurement information includes at least one of the following: scheduling information sent by the UE last time, periodical measurement duration, unhappy times, and latest reference grant information. Unhappy times is the number of times the happy bit represents unhappiness. The sending module 802 may further be configured to send the auxiliary measurement information to the second base station.

A transmission mode in which the sending module 802 is further configured to send the auxiliary uplink control information to the second base station may be that: the sending module 802 is further configured to send, to the second base station by using a control plane message or a data plane frame protocol, the auxiliary uplink control information and other related information, for example, the timing information and the auxiliary measurement information.

Optionally, the acquiring module 801 may be further configured to determine content of the foregoing auxiliary uplink control information according to scheduling configuration information; and the sending module 802 may be further configured to determine the foregoing reporting mode or transmission mode according to the scheduling configuration information, so as to send the auxiliary uplink control information and other related information, for example, the timing information and the auxiliary measurement information. If the base station 800 may be a first base station in FIG. 1(a) to FIG. 1(f), the base station 800 may further include a configuring module 804, configured to determine the scheduling configuration information, and the acquiring module 801 may be further configured to acquire the scheduling configuration information from the configuring module 804; or if the base station 800 may be a first base station in FIG. 1(a) to FIG. 1(e), the acquiring module 801 is further configured to acquire the scheduling configuration information from a first network side device, where the first network side device may be a first network side device in FIG. 1(a) to FIG. 1(e); or if the base station 800 may be the first base station in FIG. 1(f), the acquiring module 801 is further configured to acquire the scheduling configuration information from the second base station, where the second base station may be the second base station in FIG. 1(f).

If the base station 800 is a first base station in FIG. 1(a) to FIG. 1(f), the acquiring module 801 may be further configured to acquire the scheduling configuration information from the base station 800 before the acquiring module 801 acquires the auxiliary uplink control information, or before the sending module 802 sends the auxiliary uplink control information to the second base station. The acquiring module 801 is further configured to acquire the auxiliary uplink control information according to the scheduling configuration information; and the sending module 802 is further configured to send the auxiliary uplink control information and other related information, for example, the timing information and the auxiliary measurement information, to the second base station according to the scheduling configuration information.

If the base station 800 is a first base station in FIG. 1(a) to FIG. 1(e) and the scheduling configuration information is acquired by the acquiring module 801 from the first network side device, the acquiring module 801 is further configured to acquire the scheduling configuration information from the first network side device before the acquiring module 801 acquires the auxiliary uplink control information, or before the sending module 802 sends the auxiliary uplink control information to the second base station. The acquiring module 801 is further configured to acquire the auxiliary uplink control information according to the scheduling configuration information; and the sending module 802 is further configured to send the auxiliary uplink control information and other related information, for example, the timing information and the auxiliary measurement information, to the second base station according to the scheduling configuration information.

If the base station 800 is the first base station in FIG. 1(f) and the scheduling configuration information is acquired by the acquiring module 801 from the second base station, the acquiring module 801 is further configured to acquire the scheduling configuration information sent by the second base station before the acquiring module 801 acquires the auxiliary uplink control information, or before the sending module 802 sends the auxiliary uplink control information to the second base station. The acquiring module 801 is further configured to acquire the auxiliary uplink control information according to the scheduling configuration information; and the sending module 802 is further configured to send the auxiliary uplink control information and other related information, for example, the timing information and the auxiliary measurement information, to the second base station according to the scheduling configuration information.

Optionally, if the base station 800 is a first base station in FIG. 1(a) to FIG. 1(e), the acquiring module 801 is further configured to acquire an auxiliary scheduling request from the first network side device before the auxiliary uplink control information is acquired, and the sending module 802 is further configured to send an auxiliary scheduling response to the first network side device after the acquiring module 801 acquires the auxiliary scheduling request; and if the base station 800 is the first base station in FIG. 1(f), the acquiring module 801 is further configured to acquire an auxiliary scheduling request sent by the second base station before the auxiliary uplink control information is acquired, and the sending module 802 is further configured to send an auxiliary scheduling response to the second base station after the acquiring module 801 acquires the auxiliary scheduling request.

If the base station 800 is a first base station in FIG. 1(a) and FIG. 1(d), the sending module 802 is further configured to send, to the second base station directly or through the first network side device, the auxiliary uplink control information and other related information, for example, the timing information and the auxiliary measurement information; and if the base station 800 is a first base station in FIG. 1(b), FIG. 1(c), FIG. 1(e), and FIG. 1(f), the sending module 802 is further configured to send, to the second base station directly or through a second network side device and the first network side device, the auxiliary uplink control information and other related information, for example, the timing information and the auxiliary measurement information. Similarly, the acquiring module 801 is further configured to acquire, directly or through at least one network side device, the auxiliary scheduling request and information such as the scheduling configuration information that are sent by the second base station or the first network side device, and no detail is repeatedly described herein.

The base station 800 may solve a problem in which a second base station in FIG. 1(a) to FIG. 1(f) cannot acquire or correctly demodulate uplink information sent by a UE and consequently cannot schedule uplink data from the UE.

Figure 9:
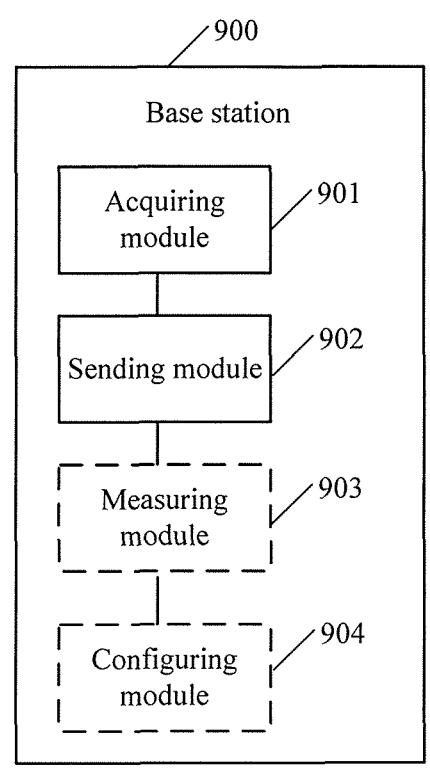
FIG. 9 is a schematic block diagram of another base station according to an embodiment of the present invention.

FIG. 9 is a schematic block diagram of another base station 900 according to an embodiment of the present invention. The base station 900 may be a second base station in FIG. 1(a) to FIG. 1(f), and the base station 900 includes:

an acquiring module 901, configured to acquire auxiliary uplink control information from a first base station, where the first base station may be a first base station in FIG. 1(a) to FIG. 1(f); and a sending module 902, configured to send grant information to a UE, so that uplink data scheduling is performed for the UE.

The auxiliary uplink control information acquired by the acquiring module 901 may be at least one of the following: scheduling information, a happy bit, and reference grant information. The UE may separately send the scheduling information, or may further send other information when sending the scheduling information. If the auxiliary uplink control information acquired by the acquiring module 901 is the scheduling information separately sent by the UE, the sending module 902 is further configured to send an acknowledgement indication to the UE.

Optionally, if the auxiliary uplink control information acquired by the acquiring module 901 is the scheduling information separately sent by the UE, the acquiring module 901 is further configured to acquire timing information from the first base station, where the timing information may be an HARQ process number or TTI information. If the acquiring module 901 obtains the scheduling information separately sent by the UE and the timing information sent by the first base station, the sending module 902 is further configured to send, to the UE, an acknowledgement indication to avoid a problem in which if the second base station does not send the acknowledgement indication to acknowledge receipt of the scheduling information separately sent by the UE, the UE resends the scheduling information repeatedly until the maximum number of retransmissions is reached.

Optionally, the acquiring module 901 is further configured to acquire timing information if the auxiliary uplink control information acquired by the acquiring module 901 is the reference grant information. Specifically, the acquiring module 901 is further configured to acquire, from the first base station, the timing information indicating sending the reference grant information, where the timing information includes at least one of the following: a continuous frame number, a system frame number, and a subframe number. The second base station determines, according to the timing information, the HARQ process number or the TTI information indicating when to send to the UE.

Optionally, the acquiring module 901 is further configured to acquire auxiliary measurement information from the first base station, where the auxiliary measurement information includes at least one of the following: scheduling information sent by the UE last time, periodical measurement duration, unhappy times, and latest reference grant information. Unhappy times is the number of times the happy bit represents unhappiness.

The acquiring module 901 is further configured to acquire the auxiliary uplink control information and other related information, for example, the timing information and the auxiliary measurement information from the first base station by using a control plane message or a data plane frame protocol.

Optionally, the base station 900 may further include a measuring module 903, configured to measure trigger information, where the trigger information includes at least one of the following: a rate of failing in acquiring data from the UE or demodulating data from the UE, a signal to interference ratio, and a bit error rate. The trigger information may be preset, or measured according to trigger configuration information, where the trigger configuration information is used for indicating at least one of the following: the trigger information that needs to be measured, measurement duration, and a trigger threshold.

Optionally, the base station 900 may further include a configuring module 904, configured to determine trigger configuration information, so that the measuring module 903 measures the trigger information according to the trigger configuration information.

Optionally, in the architectures in FIG. 1(*a*) to FIG. 1(*e*), the base station 900 includes a function of a base station; and in the architecture in FIG. 1(*f*), the base station 900 includes a function of a base station and a function of an RNC.

Optionally, if the base station 900 is a second base station in FIG. 1(*a*) to FIG. 1(*e*), the acquiring module 901 is further configured to acquire the trigger configuration information from a first network side device, where the first network side device is a first network side device in FIG. 1(*a*) to FIG. 1(*e*).

Optionally, if the base station 900 is a second base station in FIG. 1(*a*) to FIG. 1(*e*) and the trigger configuration information is sent by the first network side device, the acquiring module 901 is further configured to acquire the trigger configuration information from the first network side device before the measuring module 903 measures the trigger information. The measuring module 903 is further configured to measure the trigger information according to the trigger configuration information.

Optionally, if the base station 900 is a second base station in FIG. 1(*a*) to FIG. 1(*e*) and the trigger information meets a trigger threshold, the sending module 902 is further configured to send an auxiliary scheduling start indication to the first network side device, so that the first network side device sends an auxiliary scheduling request to the first base station when the auxiliary scheduling start indication is acquired.

Optionally, if the base station 900 is the second base station in FIG. 1(*f*), the trigger information may further include a volume of data successfully acquired by the base station 900 from the UE, and if the volume of the data is less than the trigger threshold or at least one of the following meets the trigger threshold: a rate of failing in acquiring the data from the UE or demodulating the data from the UE, a signal to interference ratio, and a bit error rate, the sending module 902 is further configured to send an auxiliary scheduling request to the first base station.

Optionally, if the base station 900 is the second base station in FIG. 1(*f*), the acquiring module 901 is further configured to acquire an auxiliary scheduling response from the first base station.

Optionally, if the base station 900 is the second base station in FIG. 1(*f*), the configuring module 904 is further configured to determine scheduling configuration information, and the sending module 902 is further configured to send the scheduling configuration information to the first base station, where the scheduling configuration information is used for indicating at least one of the following: content, a reporting mode, and a transmission mode of the auxiliary uplink control information.

If the base station 900 is a second base station in FIG. 1(*a*) and FIG. 1(*d*), the acquiring module 901 is further configured to acquire, directly or through the first network side device, the auxiliary uplink control information and other related information, for example, the timing information and the auxiliary measurement information; and if the base station 900 is a second base station in FIG. 1(*b*), FIG. 1(*c*), FIG. 1(*e*), and FIG. 1(*f*), the acquiring module 901 is further configured to acquire, directly or through a second network side device and the first network side device, the auxiliary uplink control information and other related information, for example, the timing information and the auxiliary measurement information. Similarly, the sending module 902 is further configured to send, to the first base station directly or through at least one network side device, the auxiliary scheduling request and information such as the scheduling configuration information, and no detail is repeatedly described herein.

The base station 900 may solve a problem in which a second base station in FIG. 1(*a*) to FIG. 1(*f*) cannot acquire or correctly demodulate uplink information sent by a UE and consequently cannot schedule uplink data from the UE.

Another embodiment of the present invention discloses a base station, including: a processor, configured to acquire auxiliary uplink control information; and a transmitter, configured to send the auxiliary uplink control information to a second base station.

The processor is configured to acquire scheduling information and/or a happy bit from a user equipment, or is configured to determine reference grant information according to quality of a link from the user equipment to the base station; and the processor is configured to determine at least one of the following is the auxiliary uplink control information: the scheduling information, the happy bit, and the reference grant information.

If the processor determines the reference grant information is the auxiliary uplink control information, or if the processor determines the scheduling information is the auxiliary uplink control information, or if the user equipment separately sends the scheduling information and the processor determines the scheduling information separately sent by the user equipment is the auxiliary uplink control information, the transmitter is further configured to send timing information to the second base station.

The processor is further configured to acquire, before the auxiliary uplink control information is acquired, an auxiliary scheduling request from a first network side device or the second base station, where the first network side device is a radio network controller for the second base station.

The processor is further configured to acquire, before the processor acquires the auxiliary uplink control information or before the transmitter sends the auxiliary uplink control information to the second base station, scheduling configuration information.

The transmitter is configured to send the auxiliary uplink control information to the second base station; or the transmitter is configured to send, if the processor obtains the auxiliary uplink control information, the auxiliary uplink control information to the second base station; or the transmitter is configured to periodically send the auxiliary uplink control information to the second base station.

The processor is further configured to measure auxiliary measurement information. The transmitter is further configured to periodically send the auxiliary measurement information to the second base station.

Another embodiment of the present invention further provides a base station, including: a processor, configured to acquire auxiliary uplink control information from a first base station; and a transmitter, configured to send grant information to a user equipment according to the auxiliary uplink control information, so that uplink data scheduling is performed for the user equipment.

The auxiliary uplink control information acquired by the processor from the first base station includes at least one of the following: scheduling information, a happy bit, and reference grant information.

If the auxiliary uplink control information is the reference grant information, or if the auxiliary uplink control information is the scheduling information, or if the user equipment separately sends the scheduling information and the first base station determines the scheduling information separately sent by the user equipment is the auxiliary uplink control information, the processor is further configured to acquire timing information.

If the auxiliary uplink control information is the scheduling information separately sent by the user equipment and the processor acquires the timing information, the transmitter is further configured to send an acknowledgement indication to the user equipment.

The processor is further configured to measure trigger information, where the trigger information includes at least one of the following: a rate of failing in acquiring data from the user equipment or demodulating data from the user equipment, a signal to interference ratio, and a bit error rate. The transmitter is further configured to send, if the trigger information measured by the processor meets a trigger threshold, an auxiliary scheduling start indication to a first network side device.

The processor is further configured to measure trigger information, where the trigger information includes a volume of data successfully acquired by the base station from the user equipment or at least one of the following: a rate of failing in acquiring data from the user equipment or demodulating data from the user equipment, a signal to interference ratio, and a bit error rate. The transmitter is further configured to send an auxiliary scheduling request to the first base station.

The processor is further configured to determine trigger configuration information, and measure the trigger information according to the trigger configuration information, where the trigger configuration information is used for indicating at least one of the following: the trigger information that needs to be measured, measurement duration, and the trigger threshold.

The processor is further configured to acquire trigger configuration information, and measure the trigger information according to the trigger configuration information, where the trigger configuration information is used for indicating at least one of the following: the trigger information that needs to be measured, measurement duration, and the trigger threshold.

The processor is further configured to determine scheduling configuration information. The transmitter is further configured to send the determined scheduling configuration information to the first network side device.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present invention essentially, or the part contributing to the prior art, or a part of the technical solutions may be implemented in a form of a software product. The software product is stored in a storage medium and includes several instructions for instructing a computer device (which may be a personal computer, a server, or a network device) or a processor to perform all or a part of the steps of the methods described in the embodiments of the present invention. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for assisting in uplink transmission, the method comprising:
    acquiring, by a first base station, auxiliary uplink control information of a user equipment;
    sending, by the first base station, the auxiliary uplink control information to a second base station for scheduling uplink data for the user equipment according to the auxiliary uplink control information;
    determining, by the first base station, at least one of scheduling information, a happy bit, and reference grant information is the auxiliary uplink control information of the user equipment;
    acquiring, by the first base station, the scheduling information and the happy bit from the user equipment;
    determining, by the first base station, according to quality of an uplink link from the user equipment to the first base station, the reference grant information that needs to be sent to the user equipment; and
    sending, by the first base station, timing information to the second base station if
       the first base station determines the reference grant information is the auxiliary uplink control information, or
       the first base station determines the scheduling information is the auxiliary uplink control information, or
       the user equipment separately sends the scheduling information and the first base station determines the scheduling information separately sent by the user equipment is the auxiliary uplink control information.

2. The method according to claim 1, wherein:
    the auxiliary scheduling request is sent to the first base station when a volume of data successfully acquired by the second base station from the user equipment is periodically measured and the data volume is less than a trigger threshold; or
    the auxiliary scheduling request is sent to the first base station if an auxiliary scheduling start indication is obtained from the second base station, wherein the auxiliary scheduling start indication is sent to the first network side device when trigger information measured by the second base station meets a trigger threshold, and at least one of the following is preset, or measured according to trigger configuration information: a type of the trigger information measured by the second base station, a measurement duration, and the trigger threshold, and the trigger configuration information is preset on the second base station or is acquired from the first network side device.

3. The method according to claim 1, wherein before acquiring the auxiliary uplink control information, or before sending the auxiliary uplink control information to the second base station, the method further comprises:
    acquiring, by the first base station, scheduling configuration information, wherein the scheduling configuration information is used for indicating at least one of the following: content, a reporting mode, and a transmission mode of the auxiliary uplink control information.

4. A method for assisting in uplink transmission, the method comprising:
    determining, by a first base station, at least one of scheduling information, a happy bit, and reference grant information is auxiliary uplink control information of a user equipment;
    acquiring, by the first base station, the scheduling information and the happy bit from the user equipment;
    determining, by the first base station, according to quality of an uplink link from the user equipment to the first base station, the reference grant information that needs to be sent to the user equipment;
    acquiring, by a second base station, the auxiliary uplink control information from the first base station; and
    sending, by the second base station, the reference grant information to a user equipment according to the auxiliary uplink control information for scheduling uplink data for the user equipment; and
    acquiring, by the second base station, timing information if the auxiliary uplink control information is the scheduling information, or if the auxiliary uplink control information is the reference grant information, or if the user equipment separately sends the scheduling information and the first base station determines the scheduling information separately sent by the user equipment is the auxiliary uplink control information.

5. The method according to claim 4, wherein the method further comprises:
    measuring, by the second base station, trigger information comprising at least one of the following: a rate of failing in acquiring data from the user equipment or demodulating data from the user equipment, a signal to interference ratio, and a bit error rate; and
    sending, by the second base station, an auxiliary scheduling start indication to a first network side device for sending an auxiliary scheduling request to the first base station if the auxiliary scheduling start indication is obtained if the trigger information meets a trigger threshold, wherein the first network side device is a radio network controller.

6. The method according to claim 4, wherein the method further comprises:
measuring, by the second base station, trigger information comprising a volume of data successfully acquired from the user equipment or at least one of the following: a rate of failing in acquiring data from the user equipment or demodulating data from the user equipment, a signal to interference ratio, and a bit error rate; and
sending, by the second base station, an auxiliary scheduling request to the first base station in if the trigger information meets a trigger condition.

7. The method according to claim 5, wherein before measuring, by the second base station, the trigger information, the method further comprises:
acquiring, by the second base station, trigger configuration information used for indicating at least one of the following: the trigger information that needs to be measured, a measurement duration, and the trigger threshold.

8. A base station, comprising:
a processor, configured to:
  acquire auxiliary uplink control information;
  acquire scheduling information and/or a happy bit from a user equipment, or determine reference grant information according to quality of a link from the user equipment to the base station; and
  determine at least one of the following: the scheduling information, the happy bit, and the reference grant information is the auxiliary uplink control information; and a transmitter, configured to:
  send the auxiliary uplink control information to a second base station; and
  send timing information to the second base station
    if the processor determines the reference grant information is the auxiliary uplink control information, or
    if the processor determines the scheduling information is the auxiliary uplink control information, or
    if the user equipment separately sends the scheduling information and the processor determines the scheduling information separately sent by the user equipment is the auxiliary uplink control information.

9. The base station according to claim 8, wherein:
the processor is further configured to measure auxiliary measurement information; and
the transmitter is further configured to periodically send the auxiliary measurement information to the second base station.

10. A base station, comprising:
a processor, configured to
acquire auxiliary uplink control information from a first base station, wherein the auxiliary uplink control information comprises at least one of the following: scheduling information, a happy bit, and reference grant information;
acquire the scheduling information and the happy bit from a user equipment; and
acquire timing information
  if the auxiliary uplink control information is the reference grant information, or
  if the auxiliary uplink control information is the scheduling information, or
  if the user equipment separately sends the scheduling information and the first base station determines the scheduling information separately sent by the user equipment is the auxiliary uplink control information;
determine, according to quality of an uplink link from the user equipment to the base station, the reference grant information that needs to be sent to the user equipment; and
a transmitter, configured to send the grant information to the user equipment according to the auxiliary uplink control information, so that uplink data scheduling is performed for the user equipment.

11. The base station according to claim 10, wherein:
the processor is further configured to measure trigger information comprising at least one of the following: a rate of failing in acquiring data from the user equipment or demodulating data from the user equipment, a signal to interference ratio, and a bit error rate; and
the transmitter is further configured to send, if the trigger information meets a trigger threshold, an auxiliary scheduling start indication to a first network side device.

12. The base station according to claim 10, wherein:
the processor is further configured to measure trigger information comprising a volume of data successfully acquired by the base station from the user equipment or at least one of the following: a rate of failing in acquiring data from the user equipment or demodulating data from the user equipment, a signal to interference ratio, and a bit error rate; and
the transmitter is further configured to send an auxiliary scheduling request to the first base station.

* * * * *